Dec. 20, 1960 F. A. KROHM 2,964,775
MEANS FOR ATTACHING A WIPER ARM TO A SHAFT
Original Filed Jan. 2, 1953 2 Sheets-Sheet 1
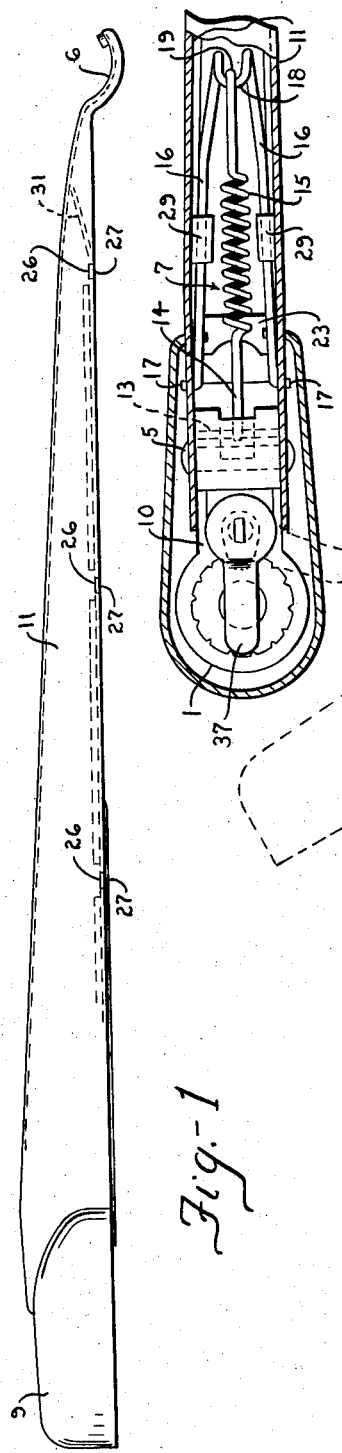
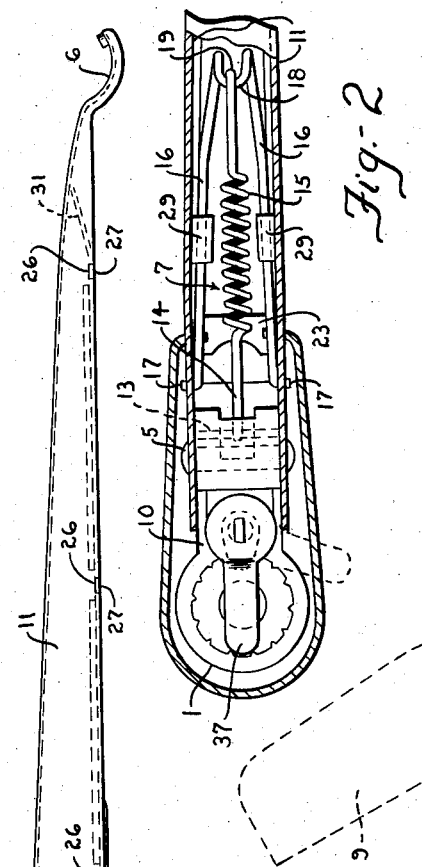
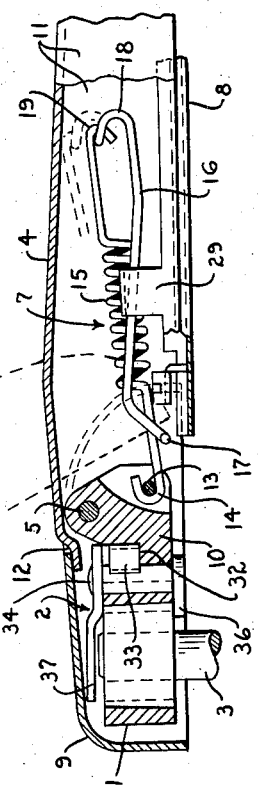
INVENTOR.
FRED A KROHM
BY
*Charles S. Penfold*
ATTORNEY Dec. 20, 1960         F. A. KROHM         2,964,775
MEANS FOR ATTACHING A WIPER ARM TO A SHAFT
Original Filed Jan. 2, 1953         2 Sheets-Sheet 2

INVENTOR.
FRED A. KROHM
BY
Charles S. Penfold
ATTORNEY

United States Patent Office 2,964,775
Patented Dec. 20, 1960

2,964,775

MEANS FOR ATTACHING A WIPER ARM TO A SHAFT

Fred A. Krohm, Hobart, Ind., assignor to The Anderson Company, a corporation of Indiana Original application Jan. 2, 1953, Ser. No. 329,366, now Patent No. 2,860,364, dated Nov. 18, 1958. Divided and this application May 31, 1955, Ser. No. 511,935

2 Claims. (Cl. 15—250.34)

This invention is directed to improvements in windshield wiper equipment.

An important object of the invention is to provide a wiper arm comprising a head or inner shaft-attaching section and an outer elongate wiper blade-carrying section, a cover for the outer section, a cap for the head section, and a unique spring assembly operatively related to the sections for performing a plurality of functions.

More particularly, an object of the invention is to provide a spring assembly which simultaneously serves to urge the outer blade-carrying section of the arm toward a windshield, and assist in maintaining the cap and cover in predetermined covering positions with respect to the inner and outer sections of the arm.

A specific object of the invention is to provide an arm assembly in which the cap for the head section is pivotally mounted on the outer arm section with key means cooperating with the cap and the cover on the outer section in a manner whereby the spring on the spring assembly acts on the cover and the cover on the cap through the intermediation of the key means to normally maintain the cap in a position to conceal the head section. The key means also serves to positively lock the cap to the outer arm section.

Another object of the invention is to provide the head section with improved means for detachably connecting the head section to a drive shaft or fitting thereon. One novel feature of the locking means resides in the simplicity of its efficient operation and the fact that it cannot be manipulated until the cap is pivoted to permit access to the locking means.

An additional object of the invention is to construct the locking means and the cap so that the cap cannot be released to a full covering position about the head section until the locking means is in a predetermined locking position.

A further object of the invention is to design and construct the cap and the locking means in such a manner that the cap may be utilized to direct the locking means into a predetermined locking position.

Other attributes of the invention reside in its simplicity, efficiency of operation, and the manner in which the various components of the arm assembly can be manufactured and assembled on a production basis.

Referring to the drawings:

Figure 1 is a side view of the arm assembly;

Figure 2 is an enlarged partial top view of the wiper arm assembly with portions in section for the purpose of exemplifying details of the construction;

Figure 3 is an enlarged longitudinal partial section of the arm showing the normal operative relationship between various components of the arm assembly;

Figure 6:
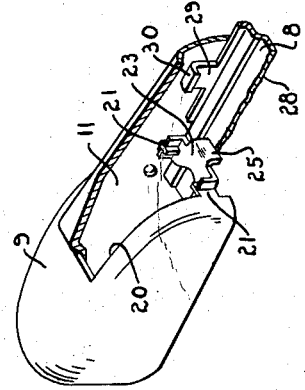
Figure 6 is a fragmentary perspective view showing the operative relationship between the key means, the cap and the cover for the outer arm section.
Figure 9:
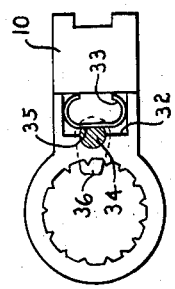
Figures 7, 8 and 9 are views showing structural details of the locking means employed by which the head section can be readily detachably connected to a drive shaft or to a fitting thereon.

This application is a division of my copending application Serial No. 329,366, filed January 2, 1953, now Patent No. 2,860,364.

Referring primarily to Figures 1 through 4 of the drawing there is shown an arm assembly comprising, among other things, a head or inner shaft-attaching section generally designated 1, locking means generally designated 2 for detachably connecting the head section to a drive shaft 3, an elongate channel outer arm section 4 having its inner end connected by a pivot 5 to the head section 1 and its outer end provided with an entering part 6 adapted for detachable connection to a fitting carried by a windshield wiper blade, a novel spring assembly generally designated 7, an elongate cover 8 carried by the arm section 4 for concealing the spring assembly, and a cap 9 movably supported on the arm section for covering the head section and the locking means.

Figure 4:
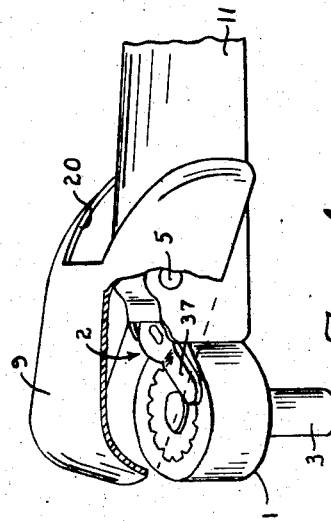
Figure 4 is a view illustrating the manner in which the cap for the head section serves to actuate the locking means for detachably connecting the head section of the arm to a shaft.
Figure 7:
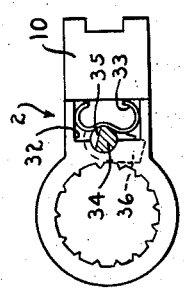
Figure 10:
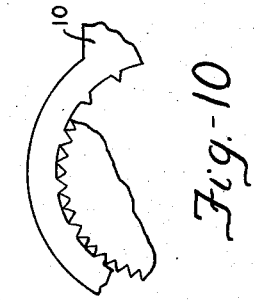
Figure 10 is a partial view showing the operative relationship with the serrations provided on the head section and the fitting carried by the drive shaft.

The head section 1 of the arm includes a tapered cylindrical sleeve having internal longitudinal ribs or serrations which are adapted to cooperate with ribs formed externally on a fitting or drum fixed on the shaft 3 as shown in Figures 2, 3 and 4, the arrangement being such that the head section can be attached to the fitting in any one of an infinite number of rotative positions. The fitting shown is a separate part secured to the shaft but it may be formed as an inegral part thereof. The head section is provided with a radial extension 10 having an upturned portion through which the pivot 5 extends.

The arm section 4 is generally in the form of a tapered channel of varying V-shape in cross section throughout the major portion of its length and includes corresponding side walls 11 and a front wall having an inner flat offset 12 which is disposed under the front wall of the cap 9 to promote continuity between the outer section and cap. The inner portions of the side walls of the arm section straddle the radial extension 10 on the head section and the pivot 5 extends through these inner portions and the upturned portion of the head section as shown in Figures 2 and 4 to pivotally connect the arm sections. The radial extension 10 is provided with a recess of a predetermined size and a pin 13 secured to the extension extends transversely therethrough the recess. This pin is preferably located below the pivot 5 and the inner hook end 14 of a helical spring 15 is detachably connected thereto.

The unique spring assembly generally designated 7 includes the spring 15 and an elongate lever preferably constructed of stiff but resilient wire. This lever is preferably made in the form of an elongate V having corresponding legs 16 which are preferably offset or angled at their inner extremities and formed with laterally extending pintles 17 constituting pivots which are seated in apertures provided therefor on the side walls 11 of the arm section 4 as shown in Figures 2 and 3. The outer free end of the lever is provided with an inturned loop 18 to which the outer hook end 19 of the spring is detachably connected. The spacing between the legs 16 of the lever is predetermined so as to afford sufficient clearance for movement of the spring therebetween. In order to facilitate assembly of the spring it is preferably so designed and constructed that either of its ends 14 and 19 may be detachably connected to the pin 13 on the head section or to the loop 18 on the lever. Attention is directed to the fact that the points of connection between the spring and the pin 13 and between the spring and the loop 18 are located at one side of the points of connection between the pintles 17 and the arm section 4 so as to obtain an appropriate leverage action which will normally urge such section in a direction toward a windshield. In other words, the spring and lever constituting the components of the spring assembly are operatively connected with respect to one another and with respect to the arm sections so that the line of force exerted by the spring is arranged in a predetermined location with respect to the pivot 5 as well as the points of connection just referred to so as to urge the arm section 4 in a direction so that a wiper blade attached to the entering part 6 will be pressed against a windshield.

The manner of attaching the spring assembly 7 to the arm sections will now be described. The lever is connected to the arm section 4 by merely pressing the legs 16 of the lever together and then inserting its inner extremity into the section so that when the pintles 17 register with the apertures in the side walls 11 of the section the legs will snap outwardly into the apertures. When the head section and arm section of the wiper arm are manually moved to an appropriate angular relationship, the ends 14 and 19 of the spring are respectively attached to the pin 13 and the head and the loop 18 of the lever, whereupon the free extremity of the spring assembly is pushed toward the outer arm section to increase the tension or preload the spring and when the extremity approaches a certain position determined by the points of connection above referred to, it will snap into and engage the arm section 4 as depicted by the dotted lines in Figure 3 to urge this section toward a windshield.

Figure 5:
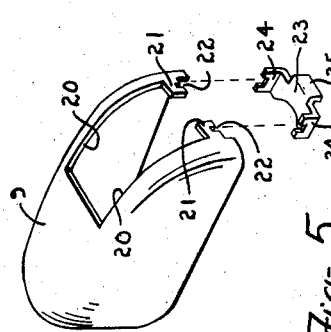
Figure 5 is a perspective view of the cap for the head section of the arm including key means for locking the cap to the outer arm section.
Figure 8:
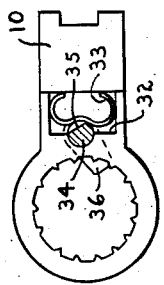

The cap 9 may be attached to the arm section 4 before or after the spring assembly is connected to the wiper arm. The cap, as clearly shown in Figures 3 through 6, among other things, includes a pair of spaced resilient side walls and a forwardly extending curved wall provided with a generally rectangular opening 20 for receiving the inner extremity of the arm section 4. This curved wall is formed with a pair of corresponding inturned opposed projections 21 which project through generally fan-shaped holes (not shown) provided in the side walls 11 of the arm section 4. The lower edge portion of each projection is provided with a notch 22 as depicted in Figure 5. A key means 23 is provided with upturned notched ends 24 which interlock with the notched projections 21 to positively lock the cap to the arm section 4. This key means is also provided with a depending finger 25 for engaging the cover 8, the purpose of which will be described subsequently.

The cap 9 is easily connected to the arm section 4 by merely spreading the resilient side walls of the cap and then sliding the cap onto the section 4 to a point to allow the projections 21 to snap into the fan-shaped holes above referred to after which the key means 23 is interconnected with the projections 21. The arm is preferably held bottom side up when the key means and cover 8 are being assembled with the arm. It will be noted by reference to Figures 3 and 4 that the cap can be tilted or pivoted to permit access to the head section 1 and the locking means 2 carried thereby.

The elongate cover 8 and its relationship with the arm section 4, spring assembly 7 and key means 23 will now be described. Referring to Figure 1 of the drawing the longitudinal marginal edges of the side walls 11 of the section 4 are preferably provided with three pairs of notches 26 within which ears 27 on the cover 8 are secured by distorting portions of the walls thereupon.

The cover is preferably provided with longitudinal side walls which fit within the confines of the section 4. The inner extremity of the cover is preferably provided with an elongate tapered embossment 28 for imparting rigidity to the cover as well as promote its appearance. This extremity is also provided with a pair of opposed parallel offsets 29 having inturned flanges 30 which hook on and bear against the sides of the legs 16 of the lever as exemplified in Figures 2 and 3 to resiliently locate the said inner extremity of the cover for movement in the section 4 and maintain the free extremity of the spring assembly more or less in the position shown by the full lines in Figure 3 apart from the front wall of the outer section 4. The cover is of a length to substantially conceal the spring assembly and the key means and bear against the finger 25 on the key means to normally maintain the cap 9 in a predetermined position to enclose the head 1 and locking means 2 as shown in Figures 1 and 3. More particularly in this regard, the projections 21 on the cap serve as pivots and the key means as a lever, which lever when pressed upwardly and pivoted by the cover 8 through the agency of the spring assembly causes the cap 9 to take the position just referred to. The outer end of the cover may be angled as at 31 to close off the outer end of the channel arm section 4 as depicted in Figure 1.

To connect the cover 8 with the spring assembly and arm section 4, the spring assembly is preferably pulled outwardly to permit the cover to be slid lengthwise of the spring assembly toward the head section of the arm so that the offsets 29 on the cover will straddle the legs 16 of the lever and the flanges 30 on the offsets will engage the legs. Due to the angularity of the legs 16 the free extremity of the spring assembly and the inner extremity of the cover will be pulled toward one another to assume the balanced normal operating condition depicted in Figure 3. The outer end of the lever is preferably tapered as shown in Figure 2, and this assists in piloting the cover onto the lever. When the cover has been properly located with the ears 27 on the cover seated in the notches 26 in the side walls 11 of the section 4, portions of the side walls are then distorted to anchor the cover in place.

Any suitable means may be utilized for connecting the head section 1 of the wiper arm to an operating means such as the drive shaft 3, but the preferred means for this purpose is clearly illustrated in Figures 3 through 9 of the drawing and will now be described. The upper side of the radial extension 10 on the head is provided with a generally rectangular recess 32 within which is snugly received a generally C-shaped spring 33 having a flat portion which is adapted to cooperate with a cylindrical pin 34 which extends transversely through the extension 10. The pin is arranged so that a portion thereof is located in the recess. The pin is provided with a flat portion 35 which is adapted to cooperate with the flat portion of the spring for normally maintaining the pin in a predetermined rotative position. The lower end of the pin is provided with a latch 36 and its upper end with a lever 37. The lever and latch are keyed to the pin for movement therewith and are preferably arranged in the same relative rotative position on the pin so that when the lever is swung to a position over the end of the shaft as shown in Figures 2 and 3 the latch 36 will take a position under the fitting carried by the shaft 3 so as to detachably lock the head or inner section 1 of the arm to the fitting. The operative relationship between the spring 33, pin, lever and the cap 9 is preferably such that when the cap is released or pushed from an elevated or tilted position it will engage the lever and cam it, as shown in Figure 4, to move the locking means to a locking position. The arrangement is such that the lower marginal edge of the cap will direct the locking means to a locking position and when the locking means reaches the predetermined rotative position as evidenced in Figure 8, an edge of the flat portion 35 on the pin will engage the flat portion on the spring in a manner whereby the spring being compressed by the pin will cause the pin to automatically swing the locking means to a locking position in advance of the cap. In other words, the spring is preloaded by movement of the pin. With this novel arrangement the cap serves as a semaphore or a signal because when the cap is in its lowermost position enclosing the head section 1 it indicates that the locking means is in a positive locking position. The cap will also cam the locking means to locking position when the lever is located on the side of the shaft opposite to which it is shown in Figure 4.

Figure 11:
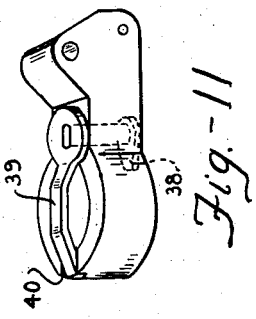

A modified form of means for locking a head section of an arm to a shaft is illustrated in Figure 11, and is similar to the locking means above described in that it includes a pin, latch 38 and a lever 39. The lever is preferably made resilient and the head section is provided with an interruption or abutment means preferably in the form of a notch 40 which receives the free end of the lever. With this arrangement the lever can be manually moved to the position shown so that the latch will lock the head section to the shaft.

Figure 12:
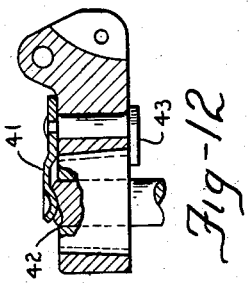
Figures 11 and 12 are modified forms of locking means for attaching the head section of an arm to a shaft.

Another modified form of means for locking a head section to a shaft is exemplified in Figure 12 of the drawing. This modification is similar to the one illustrated in Figure 11, except the end of a shortened resilient lever 41 is adapted to cooperate with a depression 42 provided in the end of a shaft for maintaining a latch 43 in a locking position.

Having thus described my invention, it is obvious that various additional modifications may be made in the same without departing from the spirit of the invention; and, therefore, I do not wish to be understood as limiting myself to the exact forms, constructions, arrangements, and combinations of parts herein shown and described.

I claim:

1. An elongate head section of a windshield wiper arm, said section being relatively thick and having an upper surface and a lower surface, said section being provided with an elongate opening extending transversely therethrough and intersecting said surfaces for the reception of a drive shaft having a shoulder thereon, said section also being provided with an aperture extending transversely therethrough in parallel relation to the opening and intersecting said surfaces, an elongate member journaled in the aperture, a latch at one end of the member for engaging the shoulder to lock the section to the shaft, means at the other end of the member for rotating the latch, said section further being provided with walls defining an internal recess adjacent the aperture and intersecting one of the said surfaces, and means disposed in the recess and engaging the elongate member for normally maintaining the latch in a locking position.

2. An elongate windshield wiper arm having a fitting for attachment to a shaft provided with abutment means and an outer section pivotally connected to the fitting for supporting a blade, said fitting being provided with an axial opening disposed transverse to the length of the arm for receiving the shaft and also with an aperture extending through the fitting in close relation to the opening, and a latch extending through the aperture, said latch having holding means adjacent one end of the opening for engaging the abutment means to lock the arm on the shaft and also having a part overlying the opposite end of the opening for manual engagement to actuate the holding means to effect release of the latter from the abutment means to permit separation of the arm from the shaft.

References Cited in the file of this patent

UNITED STATES PATENTS

| | | |
|---|---|---|
| 242,944 | Lieb | June 14, 1881 |
| 1,592,670 | Marshall | July 13, 1926 |
| 2,295,621 | Zaiger | Sept. 15, 1942 |
| 2,388,089 | Scinta | Oct. 30, 1945 |
| 2,417,991 | Nesson | Mar. 25, 1947 |
| 2,668,726 | Stewart et al. | Feb. 9, 1954 |